US006707887B2

(12) United States Patent
Geck et al.

(10) Patent No.: US 6,707,887 B2
(45) Date of Patent: Mar. 16, 2004

(54) SYSTEM AND METHOD FOR AUTOMATIC DETECTION OF LOOP START AND GROUND START TRUNKS

(75) Inventors: Bertram Geck, Boca Raton, FL (US); Francisco Olympio Marcon da Rocha, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 202 days.

(21) Appl. No.: 09/810,145

(22) Filed: Mar. 16, 2001

(65) Prior Publication Data
US 2002/0131560 A1 Sep. 19, 2002

(51) Int. Cl.[7] .................................................. H04M 3/22
(52) U.S. Cl. ...................................... 379/22; 379/26.01
(58) Field of Search ............................... 379/22, 26.01, 379/198, 234, 231, 23, 26.02

(56) References Cited

U.S. PATENT DOCUMENTS

| | | | | |
|---|---|---|---|---|
| 4,317,967 A | * | 3/1982 | De Vries et al. ................ 379/8 |
| 4,398,064 A | * | 8/1983 | Formosa, Jr. ............. 379/32.02 |
| 4,535,201 A | | 8/1985 | Kasbia et al. .................. 179/18 |
| 4,563,547 A | * | 1/1986 | Booth ......................... 379/342 |
| 4,622,439 A | | 11/1986 | Kasbia et al. ................ 379/252 |
| 4,689,816 A | * | 8/1987 | Wood .......................... 379/382 |
| 4,794,632 A | * | 12/1988 | Burton et al. .................. 379/22 |
| 4,796,290 A | * | 1/1989 | Perry ....................... 379/27.01 |
| 4,843,620 A | * | 6/1989 | Hagedorn ..................... 379/21 |
| 4,894,860 A | * | 1/1990 | Korsky et al. ............... 379/240 |
| 5,003,573 A | | 3/1991 | Agah et al. ..................... 379/27 |
| 5,325,422 A | * | 6/1994 | Ladd .......................... 379/67.1 |
| 5,416,836 A | | 5/1995 | Marinelli et al. ............ 379/377 |
| 5,479,501 A | * | 12/1995 | Lai ............................. 379/377 |

* cited by examiner

Primary Examiner—Curtis Kuntz
Assistant Examiner—Barry W Taylor

(57) ABSTRACT

Telephone equipment, such as a private branch exchange (PBX) is provided according to an implementation of the present invention. The telephone equipment includes one or more trunk interface cards. The trunk interface cards are configurable by software to operate with ground-start or loop-start trunks. According to the present invention, the trunk interface cards are controllable by software to determine which type of trunk they are connected to and to determine if the connected central office provides for far-end disconnection indication.

7 Claims, 5 Drawing Sheets

SYSTEM AND METHOD FOR AUTOMATIC DETECTION OF LOOP START AND GROUND START TRUNKS

BACKGROUND OF THE INVENTION

1. Field of the Invention

The present invention relates to telecommunications systems, and in particular, to an improved system and method for detecting loop start and ground start trunks.

2. Description of the Related Art

Loop start and ground start are the most common methods of signaling when a subscriber places a call to a central office through a private branch exchange. In loop start signaling to initiate a call, the PBX goes off hook closing the tip ring two wire loop. The central office detects the current flow and returns a dial tone. In ground start signaling to initiate a call, the PBX grounds the ring lead, which is sensed by the central office. The central office then grounds the tip lead. The PBX senses the tip ground and closes the two wire loop, and then removes the ring ground.

A feature provided in some systems is "far end disconnection." In a loop start system, this means that the central office interrupts the loop to signal the PBX a disconnection of the call attempt or completed call (i.e., a call to a non-existent number or to signal the CO customer went on hook after a conversation). Correspondingly, in a ground start system, the central office will disconnect tip from ground. As can be appreciated, the PBX must have its trunk interfaces properly configured for far end disconnection. If the trunk interfaces are configured improperly, the trunks will be unusable. Often, PBX trunk interfaces are provided with circuitry to implement both loop start and ground start signaling. If the configuration information provided by the documentation is incorrect or unavailable, than improper configuration may be installed.

As such, there is a need for a system to identify whether far end disconnection indication is provided.

SUMMARY OF THE INVENTION

These and other drawbacks in the prior art are overcome in large part by a system and method for automatic configuration of telephone trunks according to the present invention.

Telephone equipment, such as a private branch exchange (PBX) is provided according to an implementation of the present invention. The telephone equipment includes one or more trunk interface cards. The trunk interface cards are configurable by software to operate with ground-start or loop-start trunks. According to the present invention, the trunk interface cards are controllable by software to determine which type of trunk they are connected to and to determine if the connected central office provides for far-end disconnection indication.

According to an implementation of the present invention, a trunk interface closes the tip-ring loop, checks for dial tone, and dials a predetermined, disconnected or dummy test telephone number. If the central office disconnects the dial tone after the first dialed digit, the trunk is determined to be a loop-start trunk. The trunk interface waits for the time-out period to elapse and checks if the central office disconnects the loop. If so, the central office provides far-end disconnection indication for the loop trunk.

If the system determines the interface is not a loop start trunk, the system then determines if the connection is ground-start. The Ring lead is connected to ground and the interface monitors whether the tip lead goes to ground. If so, the two-wire loop is closed and the system checks for dial tone, dials a predetermined test number and checks if dial tone is disconnected by the central office after the first digit was dialed. If so, the connection has the correct polarity. The interface then waits the time out period from the central office indicating incomplete dial and determines whether the central office disconnects the tip lead from ground. If so, the central office provides far-end disconnection indication for the ground start trunk. If the connection was determined to not have the correct polarity, an error indication is generated indicating that the tip and ring wires are to be reversed.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–5 illustrate a system and method according to an implementation of the present invention. Telephone equipment, such as a private branch exchange (PBX) is provided according to an implementation of the present invention. The telephone equipment includes one or more trunk interface cards. The trunk interface cards are configurable by software to operate with ground-start or loop-start trunks. According to the present invention, the trunk interface cards are controllable by software to determine which type of trunk they are connected to and to determine if the connected central office provides for far-end disconnection indication.

Figure 1:
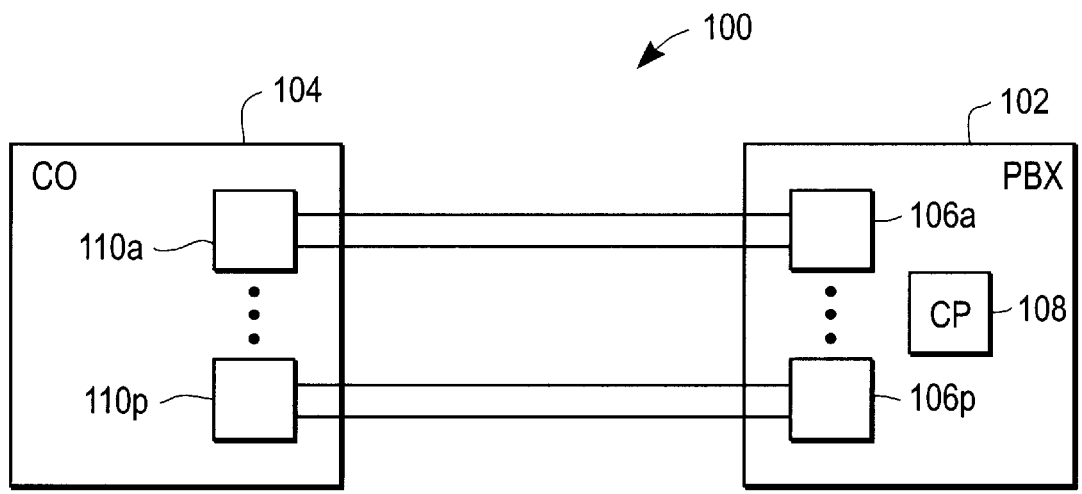
FIG. 1 is a diagram illustrating a telecommunications system according to an embodiment of the invention.

Turning now to FIG. 1, a block diagram illustrating a system according to the present invention is shown and denoted by the reference numeral 100. The system 100 includes a private branch exchange (PBX) 102 and a central office 104. The private branch exchange may be implemented as the Hicom 150H PBX available from Siemens Corp. The PBX 102 includes one or more trunk interfaces 106 for coupling to the central office 104. The central office 104 correspondingly includes one or more trunk interfaces 110. It is noted that, typically, the central office couples to more than one private branch exchange, which are not shown for clarity's sake. As will be explained in greater detail below, the PBX 102 includes one or more control processors 108 for supervising the operation of the trunk interfaces 106 according to the present invention. More particularly, the control processor 108 directs the trunk interfaces to determine whether the coupled trunk is a ground-start or loop-start trunk and to determine if the central office 104 supports far-end disconnect signaling.

Figure 2:
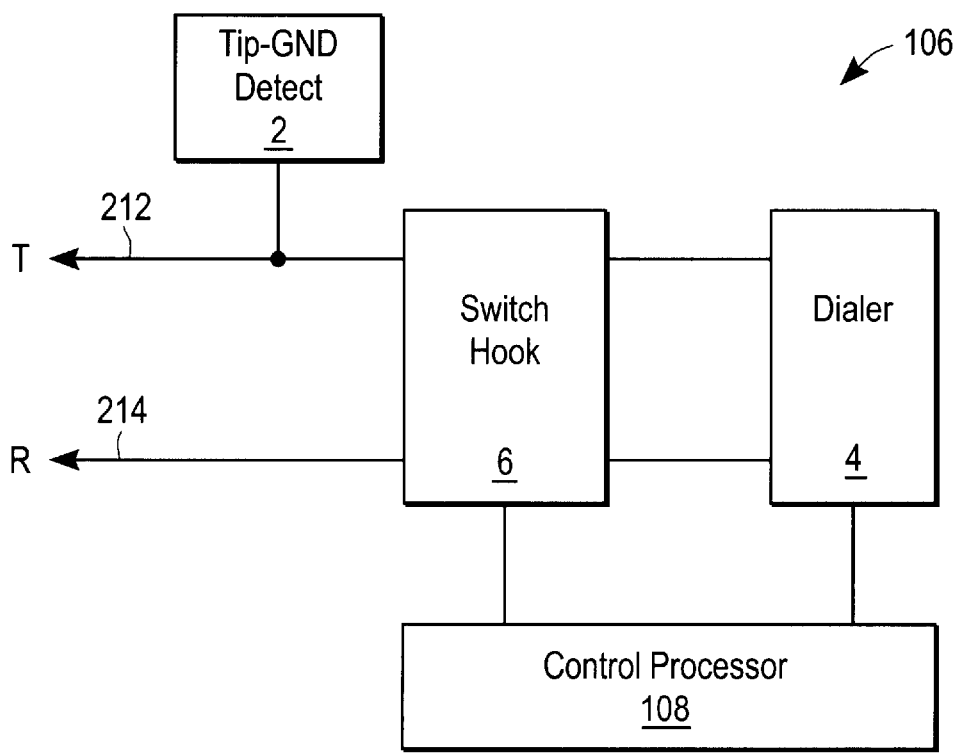
FIG. 2 is a block diagram of a trunk interface according to an implementation of the invention.

FIG. 2 is a block diagram of a trunk interface according to an implementation of the invention. As noted above, the trunk interface may be a standard trunk interface implementing software control according to the present invention. As shown, the trunk interface 106 includes a control processor 108, which may be resident at the interface itself, or may be the PBX's main processor. The control processor 108 implements software according to the present invention. In other implementations, the control processor or software may be implemented as hardware or various combinations of hardware and software.

The trunk interface circuit 106 couples to the central office via tip 212 and ring 214 leads. The trunk interface circuit 106 further includes a tip ground detect circuit 2, a dialer 4, a switch hook 6 and a dial tone detect 8.

Figure 3A:
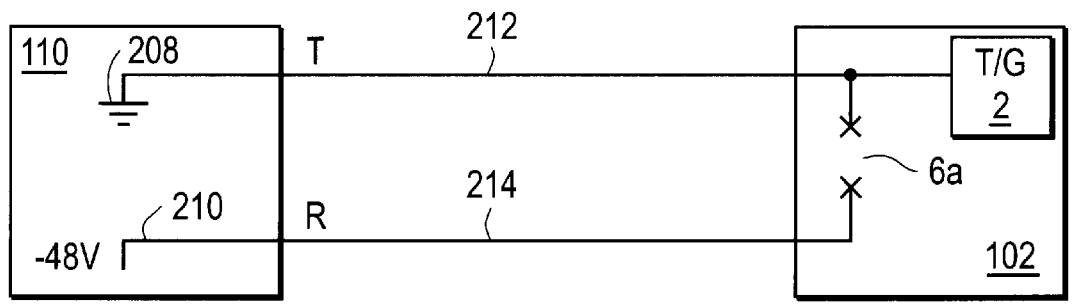
FIGS. 3A–3C illustrate loop start signaling and disconnection indication determination according to an implementation of the invention.

Operation of the present invention is shown more particularly with reference to FIGS. 3A–3C and FIGS. 4A–4D. Shown in FIG. 3A is a central office/PBX connection via tip 212 and ring 214 leads. The central office couples to the PBX by trunk interface 110 and a corresponding trunk interface 106 at the PBX. At the trunk interface 106, the switch hook 6 is off hook, as shown at 6a. The tip lead 212 connects to ground 208 at the central office trunk interface 110. The ring lead 214 couples to a –48 V source 210 at the central office trunk interface 110. Also shown at the PBX trunk interface 106 is a tip ground detect unit 2.

Figure 3B:
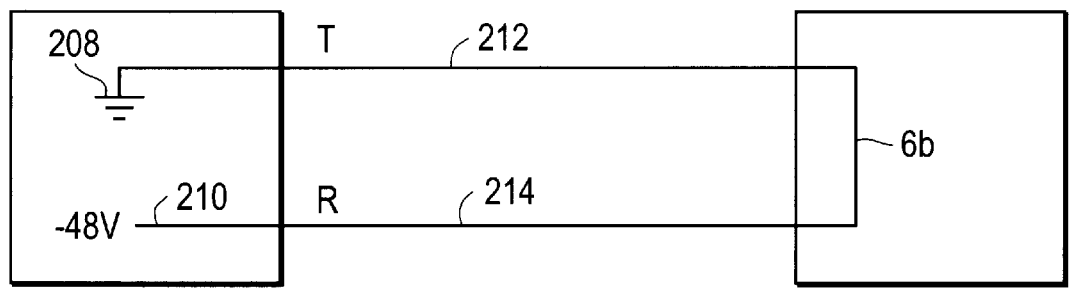
Figure 3C:
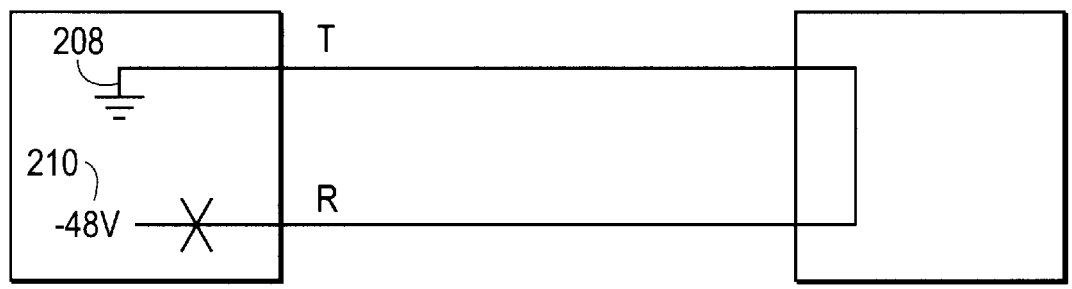

According to the present invention, the controller 108 closes the switch hook as shown at 6b in FIG. 3B. This closes the tip-ring loop and allows the central office to send a dial tone. The telephone controller 108 then causes the PBX to dial a test number that is known to be unconnected. If the central office disconnects the dial tone in response to the first dialed number, then the controller 108 identifies the trunk as a loop-start trunk. The controller 108 then waits for a time out period indicating an incomplete dial. The controller 108 then checks to see if the central office disconnects the loop, as shown in FIG. 3C. If so, then the controller 108 determines that the central office provides far end disconnection indication for the loop-start trunk.

Figure 4A:
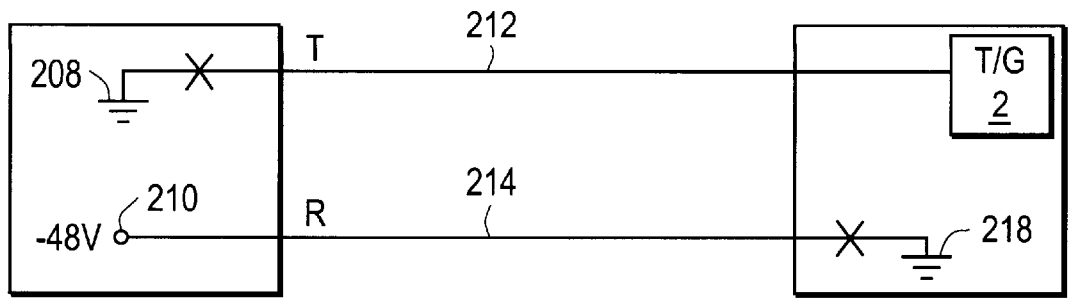
FIGS. 4A–4D illustrate ground start signaling and disconnection indication determination according to an implementation of the invention.
Figure 4B:
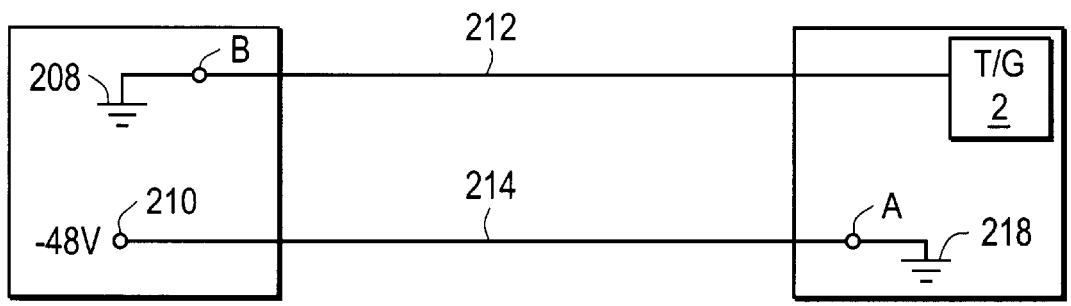
Figure 4C:
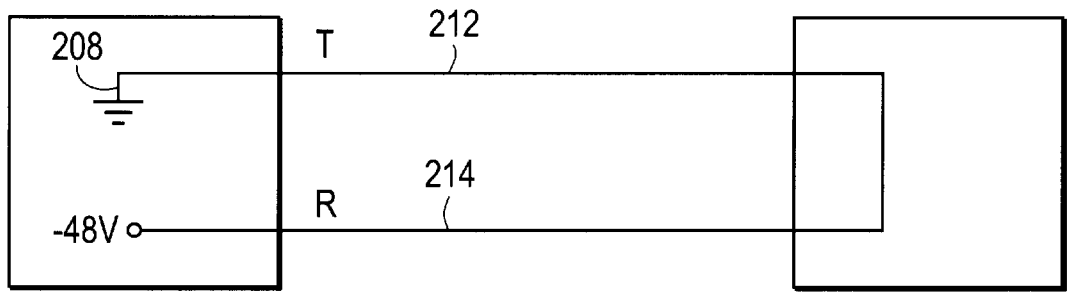
Figure 4D:
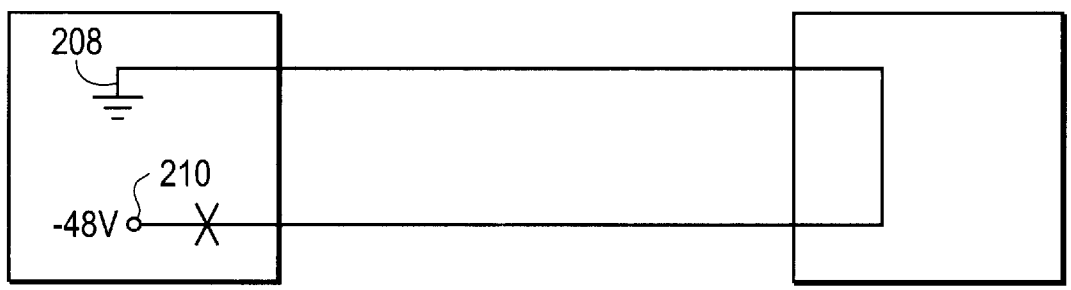

If the controller 108 determines that the CO is not providing a loop start trunk, the controller 108 undertakes similar action to determine if the trunk is a ground-start trunk and if it supports far end disconnection. In particular, as shown in FIG. 4A, the tip ground detect unit 2 is coupled to the tip lead. Also at the PBX side, the ground 218 is not yet coupled to the ring lead 214. At the central office, the tip lead is not connected to ground 208, and the ring lead is coupled to the –48 V source. As shown in FIG. 4B, the controller 108 then connects ground 218 to the ring lead 214 as shown at A. The central office should then connect the tip lead 212 to ground 208 as shown at B. If this is detected at the PBX by the tip ground detect circuitry 2, then the controller 108 closes the tip ring loop as shown in FIG. 4C. The controller 108 then checks for dial tone, dials a predetermined test number and checks if the central office turns off the dial tone. If so, then the controller 108 determines that the connection has the correct polarity. The controller 108 then waits for the time-out from the central office indicative of an incomplete dial. The controller 108 then checks to see if the central office disconnects the TIP from ground as shown at FIG. 4D. If so, the controller determines that the central office provides far end disconnection. If the ground start connection did not have the correct polarity, then the controller 108 generates a warning indication, such as via a graphical user interface, to advise the user that the leads must be switched. Once each of these determinations is made, the system can be configured accordingly.

Figure 5A:
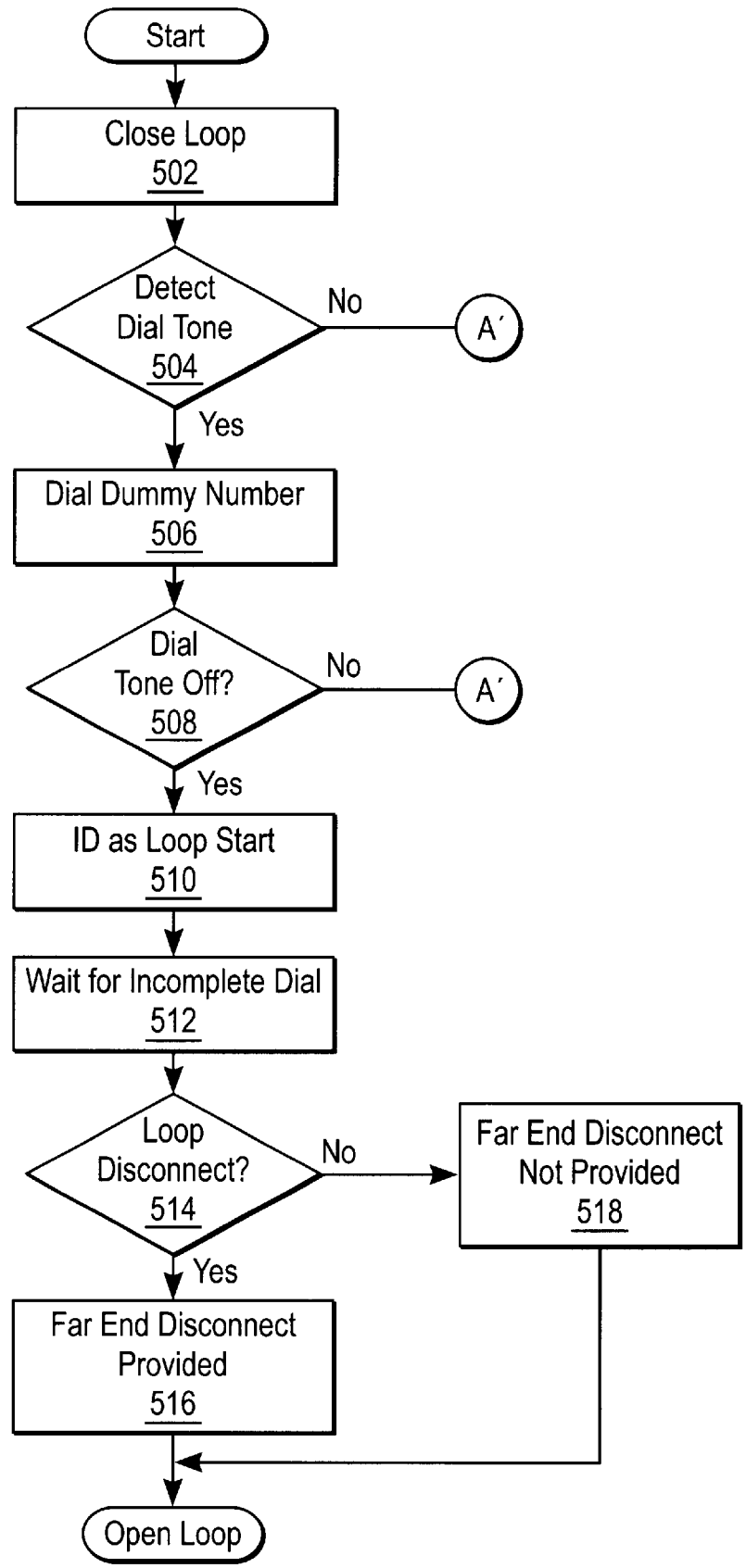
FIGS. 5A–5B is a flowchart illustrating operation of an embodiment of the invention.
Figure 5B:
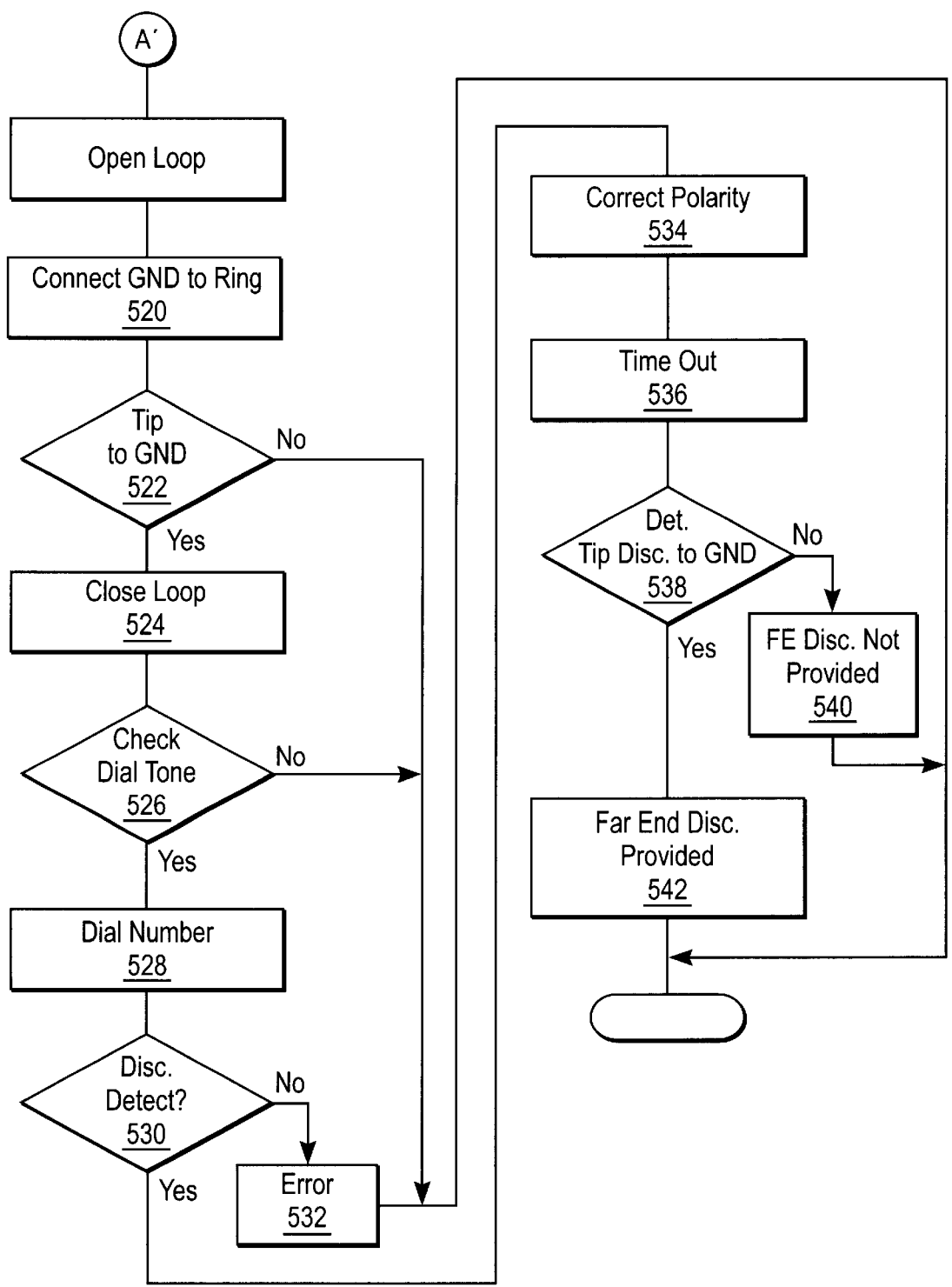

Turning now to FIGS. 5A and 5B, a flowchart illustrating process flow according to an implementation of the invention is shown. In a step 502, the controller 108 closes the tip-ring loop by closing the switch hook 6. In a step 504, the controller 108 listens for and detects dial tone. In response, in a step 506, the controller causes the dialer 4 to dial a predetermined "dummy" number. In a step 508, the controller detects whether the central office has turned the dial tone off. This may be accomplished in a known manner, such as by detecting an absence of tone over a predetermined period. If dial tone was not detected as being off, then the system will proceed to step 520 (FIG. 5B), as will be explained in greater detail below.

If dial tone is detected as being off, then in step 510, the interface is identified as being a loop start connection. In a step 512, the controller 108 waits a predetermined time out period, indicative of an incomplete dial. In a step 514, the controller 108 detects whether the central office has disconnected the loop. If so, then in step 516, the controller 108 recognizes that far end disconnection is provided. If not, the system recognizes, in step 518, that it is not.

Returning to step 508 or 504, if dial tone was not detected as ebbing off, the system tests if the connection is a ground start connection. In step 520, the controller 108 connects the ground 218 to the ring lead 214. In step 522, the tip ground detector 2 determines if the central office connected the tip lead 212 to ground 208. If not, then an error message is provided in step 523.

If tip was detected as being grounded, then in step 524, the controller 108 closes the loop and checks for a dial tone in step 526. Next, the controller 108 causes the dialer 4 to dial a predetermined dummy number and determines if the central office disconnects the dial tone. If not, in step 532, an error message is reported indicating that the leads need to be switched. If the dial tone is disconnected, then the connection is determined as having the correct polarity, in step 534. After a predetermined time out period (step 536), the controller 108 detects if the connection is disconnected, in step 538. If so, then the system is determined as providing far end disconnect, in step 542. Otherwise, in step 540, it does not.

The invention described in the above detailed description is not intended to be limited to the specific form set forth herein, but is intended to cover such alternatives, modifications and equivalents as can reasonably be included within the spirit and scope of the appended claims.

What is claimed is:

1. A method, comprising:

using a controller to control loop-start detect circuitry to determine if a trunk interface is a loop-start trunk by closing a tip ring loop at said trunk interface;
dialing a test number;
determining if said trunk interface is a loop-start or ground-start interface depending on whether a dial tone is detected as going off; and
determining if a network disconnection indication is provided by
determining if an incomplete dial is received and the loop is disconnected; and if said trunk interface is not a loop-start trunk, using said controller to control ground-start detect circuitry to determine if said trunk interface has a correct polarity by
connecting a ground to ring;
determining if tip goes to ground;
checking for dial tone;
dialing a test number;
determining if the ground-start connection has the correct polarity by detecting a dial tone disconnect; and determining if a network disconnection indication is provided by determining if an incomplete dial is received and the TIP is disconnected from ground.

2. A system, comprising:

loop-start detect circuitry;

ground-start detect circuitry; and a controller adapted to determine if a connected switch supports a far end disconnection indication;

wherein said controller is adapted to dial a dummy number, wait for a time-out indicating an incomplete dial, and determine if a corresponding connection has been terminated by said switch;

wherein said controller is adapted to employ said loop-start circuitry to determine if a trunk is a loop-start trunk by closing a tip-ring loop, checking for dial tone, dialing said dummy number and determining if said switch terminates said dial tone.

3. A system in accordance with claim 2, wherein said controller is adapted to determine if a ground-start connection has correct polarity by connecting a ring lead to ground, checking if a tip lead is grounded, closing said tip-ring loop, checking for dial tone, dialing said dummy number and determining if said switch terminates said dial tone.

4. A method, comprising:

providing loop-start detect circuitry;

providing round-start detect circuitry; and providing a controller adapted to determine if a connected switch supports a far end disconnection indication;

wherein said controller is adapted to dial a dummy number, wait for a time-out indicating an incomplete dial, and determine if a corresponding connection has been terminated by said switch;

wherein said controller is adapted to employ said loop-start circuitry to determine if a trunk is a loop-start trunk by closing a tip-ring loop, checking for dial tone, dialing said dummy number and determining if said switch terminates said dial tone.

5. A method in accordance with claim 4, wherein said controller is adapted to determine if a ground-start connection has correct polarity by connecting a ring lead to ground, checking if a tip lead is grounded, closing said tip-ring loop, checking for dial tone, dialing said dummy number and determining if said switch terminates said dial tone.

6. A method, comprising:

using a controller to operate loop-start detect circuitry to determine if a trunk is a loop-start trunk and if said trunk is a loop-start trunk, determining if said trunk supports far end disconnection indication;

wherein determining if said trunk is a loop-start trunk comprises closing a tip-ring loop, checking for dial tone, dialing said dummy number and determining if said switch terminates said dial tone;

wherein determining if said trunk supports far end disconnection indication comprises dialing a dummy number, waiting for a time-out indicating an incomplete dial, and determining if a corresponding connection has been terminated by said switch; and using a controller to operate ground-start detect circuitry to determine a polarity of said trunk if said trunk is determined to not be a loop-start trunk and if said trunk is a ground-start trunk, determining if said trunk supports far end disconnection indication;

wherein determining a polarity comprises connecting a ring lead to ground, checking if a tip lead goes to ground, closing a tip-ring loop, checking for dial tone, dialing said dummy number and determining if said switch terminates said dial tone;

wherein said determining if said trunk supports far end disconnection indication comprises dialing a dummy number, waiting for a time-out indicating an incomplete dial, and determining if a corresponding connection has been terminated by said switch.

7. A system, comprising:

loop-start detect circuitry;

ground-start detect circuitry; and a controller adapted to employ said loop-start circuitry to determine if a trunk is a loop-start trunk by closing a tip-ring loop, checking for dial tone, dialing a dummy number and determining if said switch terminates a dial tone; and if said trunk is determined not to be a loop-start trunk, said controller is adapted to determine if a ground-start connection has correct polarity by connecting a ring lead to ground, checking if a tip lead is grounded, closing said tip-ring loop, checking for dial tone, dialing a dummy number and determining if said switch terminates said dial tone;

wherein said controller is adapted to determine if a connected switch supports a far end disconnection indication by dialing a dummy number, waiting for a time-out indicating an incomplete dial, and determining if a corresponding connection has been terminated by said switch.

* * * * *